(12) United States Patent  (10) Patent No.: US 8,691,459 B2
Morikawa et al.  (45) Date of Patent: Apr. 8, 2014

(54) FUEL CELL SYSTEM AND SCAVENGING METHOD THEREFOR

(75) Inventors: Hiroshi Morikawa, Shioya-gun (JP); Yoichi Asano, Utsunomiya (JP); Jun Takano, Shimotsuke (JP); Chihiro Wake, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/331,567

(22) Filed: Dec. 20, 2011

(65) Prior Publication Data

US 2012/0094195 A1   Apr. 19, 2012

Related U.S. Application Data

(62) Division of application No. 12/258,129, filed on Oct. 24, 2008, now Pat. No. 8,101,309.

(30) Foreign Application Priority Data

Oct. 25, 2007   (JP) .................................. 2007-277579

(51) Int. Cl.
    *H01M 8/04*   (2006.01)
(52) U.S. Cl.
    USPC ........................................................ 429/429
(58) Field of Classification Search
    USPC .................. 429/427–432, 443–446
    See application file for complete search history.

(56) References Cited

U.S. PATENT DOCUMENTS

| 2002/0076583 A1 | 6/2002 | Reiser et al. |
| 2005/0058860 A1 | 3/2005 | Goebel |
| 2005/0136297 A1 | 6/2005 | Inai et al. |
| 2007/0092771 A1* | 4/2007 | Wake et al. ...................... 429/22 |
| 2007/0231623 A1 | 10/2007 | Limbeck et al. |
| 2008/0044703 A1 | 2/2008 | Shimoi |

FOREIGN PATENT DOCUMENTS

| EP | 1978586 A1 | 10/2008 |
| JP | 2-270267 | 11/1990 |
| JP | 2006-086015 | 3/2006 |
| JP | 2006-507647 | 3/2006 |
| JP | 2006-172889 | 6/2006 |
| JP | 2007-026888 | 2/2007 |
| WO | 2004/049468 A2 | 6/2004 |

OTHER PUBLICATIONS

European Search Report for Application No. 08018649.7, dated Feb. 13, 2009.
Japanese Office Action for Application No. 2007-277579, 4 pages, dated Jul. 3, 2012.

* cited by examiner

*Primary Examiner* — Jonathan G Leong
(74) *Attorney, Agent, or Firm* — Nelson Mullins Riley & Scarborough LLP; Anthony A. Laurentano

(57) ABSTRACT

A fuel cell having an oxygen-containing gas flow field and a fuel gas flow field, an oxygen-containing gas supply apparatus for supplying an oxygen-containing gas to the oxygen-containing gas flow field, a fuel gas supply apparatus for supplying a fuel gas to the fuel gas flow field, a scavenging gas supply apparatus for supplying air as a scavenging gas to the fuel gas flow field, and a controller are provided. The controller includes a voltage detection unit for detecting the voltage of the fuel cell after operation of the fuel cell is stopped and a scavenging control unit for starting scavenging in the fuel gas flow field by the scavenging gas supply apparatus after the detected voltage is decreased temporarily, increased, and decreased again to become a preset voltage or less.

2 Claims, 10 Drawing Sheets

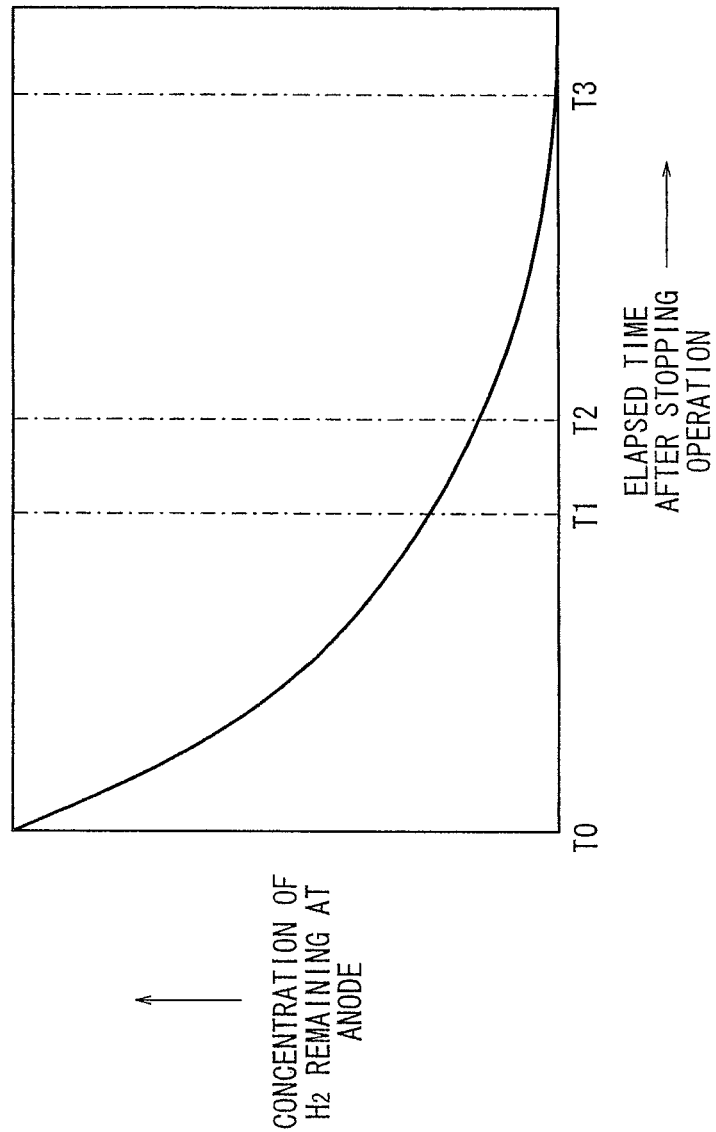

_US 8,691,459 B2_

FUEL CELL SYSTEM AND SCAVENGING METHOD THEREFOR

RELATED APPLICATIONS

This application is a divisional of U.S. application Ser. No. 12/258,129, filed Oct. 24, 2008, which claims priority to Japanese Application No. 2007-277579, filed Oct. 25, 2007, the disclosures of which are incorporated herein by reference in their entireties. The contents of any patents, patent applications, and references cited throughout this specification are hereby incorporated by reference in their entireties.

BACKGROUND OF THE INVENTION

1. Field of the Invention

The present invention relates to a fuel cell system including a fuel cell, a fuel gas supply apparatus for supplying a fuel gas to a fuel gas flow field, an oxygen-containing gas supply apparatus for supplying an oxygen-containing gas to an oxygen-containing gas flow field, a scavenging gas supply apparatus for supplying air as a scavenging gas to the fuel gas flow field, and a control device. Further, the present invention relates to a scavenging method for such a fuel cell system.

2. Description of the Related Art

The fuel cell is a system for obtaining direct current electrical energy by electrochemical reactions of a fuel gas (chiefly hydrogen-containing gas) supplied to an anode and an oxygen-containing gas supplied to a cathode.

A solid polymer electrolyte fuel cell includes a power generation cell formed by sandwiching a membrane electrode assembly between separators. The membrane electrode assembly includes the anode, and the cathode, and an electrolyte membrane interposed between the anode and the cathode. The electrolyte membrane is a solid polymer ion exchange membrane. In use of this type of power generation cell, generally, predetermined numbers of the membrane electrode assemblies and separators are alternately stacked together to form a fuel cell stack.

In this type of fuel cell, during electric generation, water is produced at the cathode, and the water is retained at the anode, due to back diffusion from the cathode. Consequently, when electric generation is halted, the residual water needs to be discharged from the cathode and the anode.

In this regard, for example, a fuel cell system disclosed in Japanese Laid-Open Patent Publication No. 2006-086015 includes a fuel cell that generates electricity by causing an electrochemical reaction between a fuel gas and an oxidant gas (an oxygen-containing gas), a fuel gas supply system that supplies the fuel gas to a fuel electrode of the fuel cell, an oxidant gas supply system that supplies the oxidant gas to an oxidant electrode of the fuel cell, humidification means for humidifying the oxidant gas, and communication means for switchably connecting and disconnecting between the fuel gas supply system and the oxidant gas supply system in an open/closed manner. At system shutdown, supply of the fuel gas to the fuel electrode of the fuel cell is stopped and at the same time, an oxidant gas that is drier than the oxidant gas supplied to the oxidant electrode for normal electricity generation is supplied to the oxidant electrode, and thereafter, the drier oxidant gas is also supplied to the fuel electrode through the communication means, and finally the fuel cell system is shut down.

Thus, the above fuel cell system first stops supplying the fuel gas to the fuel electrode of the fuel cell at system shutdown and at the same time starts supplying a dry oxidant gas such as air to the oxidant electrode, so as to reduce the water content in the catalyst layer of the oxidant electrode. The fuel cell system then stops operations after supplying the oxidant gas such as air also to the fuel electrode to replace the fuel gas in the fuel electrode with the oxidant gas, so that deterioration caused at system shutdown as well as during storage can be suppressed.

However, according to the fuel cell disclosed in Japanese Laid-Open Patent Publication No. 2006-086015, since scavenging of the anode (fuel electrode) by air is performed every time operation of the fuel cell is stopped, scavenging is performed frequently, and the anode is thus subject to deterioration. Also, when the fuel cell is started after the air scavenging, the anode is damaged at start operation. Further, when the anode is scavenged by air, large noises from an air compressor or the like are produced, and energy efficiency becomes low.

SUMMARY OF THE INVENTION

The present invention has been made to solve the problem of this type, and an object of the present invention is to provide a fuel cell system and a scavenging method for the fuel cell system in which it is possible effectively prevent degradation of the anode, and improve the energy efficiency.

The present invention relates to a fuel cell system including a fuel cell for performing power generation by electrochemical reactions of an oxygen-containing gas and a fuel gas supplied to the fuel cell. The fuel cell includes a solid polymer electrolyte membrane comprising hydrocarbon material, a cathode, and an anode. An oxygen-containing gas flow field is formed in the fuel cell for supplying the oxygen-containing gas to the cathode, and a fuel gas flow field is formed in the fuel cell for supplying the fuel gas to the anode. Further, the fuel cell system includes an oxygen-containing gas supply apparatus for supplying the oxygen-containing gas to the oxygen-containing gas flow field, a fuel gas supply apparatus for supplying the fuel gas to the fuel gas flow field, a scavenging gas supply apparatus for supplying the air as a scavenging gas to the fuel gas flow field, and a control device. Further, the present invention relates to a scavenging method for the fuel cell system.

In the present invention, the control device includes a voltage detection unit and a scavenging control unit. The voltage detection unit detects a voltage of the fuel cell after operation of the fuel cell is stopped. The scavenging control unit starts scavenging in the fuel gas flow field by the scavenging gas supply apparatus after the detected voltage is decreased temporarily, increased, and decreased again to become a preset voltage or less.

Further, in the present invention, the control device includes a gas concentration detection unit and a scavenging control unit. The gas concentration detection unit detects gas concentration in the fuel cell after operation of the fuel cell is stopped. The scavenging control unit starts scavenging in the fuel gas flow field by the scavenging gas supply apparatus when it is determined that the fuel gas remaining in the fuel gas flow field has been replaced with the air based on the detected gas concentration.

Further, in the present invention, the scavenging method includes the steps of stopping supply of the fuel gas after operation of the fuel cell is stopped, and starting scavenging in the fuel gas flow field by the scavenging gas supply apparatus after the detected voltage is decreased temporarily, increased, and decreased again to become a preset voltage or less.

Further, in the present invention, the scavenging method includes the steps of stopping supply of the fuel gas after operation of the fuel cell is stopped, and starting scavenging in the fuel gas flow field by the scavenging gas supply apparatus when it is determined that the fuel gas remaining in the fuel gas flow field has been replaced with the air.

In the present invention, after operation of the fuel cell is stopped, supply of the fuel gas is stopped, and the voltage of the fuel cell is detected. After the detected voltage is decreased temporarily, increased, and decreased again to become a preset voltage or less, scavenging in the fuel gas flow field is stared. That is, after operation of the fuel cell is stopped, since supply of the fuel gas is stopped, the voltage of the fuel cell is decreased, and the leakage (cross leakage) of the oxygen-containing gas remaining in the oxygen-containing gas flow field and the fuel gas remaining in the fuel gas flow field occurs through the electrolyte membrane.

Therefore, potentials are generated at the cathode and the anode, and the voltage of the fuel cell is increased. Further, the fuel gas is consumed in the oxygen-containing gas flow field and the fuel gas flow field, and the potentials of cathode and anode are changed to have closer values, and the voltage of the fuel cell is decreased. Then, the gases in the oxygen-containing gas flow field and the fuel gas flow field are replaced with the oxygen-containing gas (air).

Therefore, after the gases in the oxygen-containing gas flow field and the fuel gas flow field are replaced with the oxygen-containing gas, i.e., after the voltage of the fuel cell is decreased sufficiently to the preset voltage or less, scavenging in the oxygen-containing gas flow field and the fuel gas flow field using the air is started. In this manner, without inducing reactions in the oxygen-containing gas flow field and the fuel gas flow field, it is possible to effectively prevent damages or the like due to the high potential at the cathode, and prevent degradation of the membrane electrode assembly.

If operation of the fuel cell is started within a relatively short period of time of stopping operation of the fuel cell, since the gas in the fuel gas flow field has not been suitably replaced with the oxygen-containing gas, scavenging in the fuel gas flow field is not performed using the air. Therefore, the frequency of performing scavenging in the fuel gas flow field is reduced, and it is possible to suitably suppress degradation of the anode by scavenging using the air. Accordingly, since the frequency of performing scavenging in the fuel gas flow field is reduced, it is possible to prevent degradation of the anode at the time of starting operation of the fuel cell.

Further, the frequency of using a compressor for scavenging in the fuel gas flow field using the air is reduced. Therefore, generation of noises from the compressor is suppressed. It becomes possible to prevent the energy efficiency from being lowered. Further, in the period after stopping operation of the fuel cell until the air scavenging of the fuel gas flow field, the water remaining in the fuel gas flow field is cooled, and water condensation occurs easily. Therefore, at the time of scavenging in the fuel gas flow field using the air, the condensed water remaining in the fuel gas flow field is reliably discharged, and improvement in the performance of starting operation of the fuel cell system at low temperature is effectively improved advantageously.

Further, in the present invention, the supply of the fuel gas is stopped after stopping operation of the fuel cell. When it is determined that the fuel gas remaining in the fuel gas flow field has been replaced with the air, scavenging in the fuel gas flow field is started.

Therefore, when scavenging is performed using the air, since no fuel gas remains in the fuel gas flow field, it is possible to prevent unwanted reactions from being induced. Thus, it is possible to suitably prevent degradation of the membrane electrode assembly. Further, since the frequency of scavenging in the fuel gas flow field is reduced, degradation of the anode is prevented, and generation of noises and decrease in the energy efficiency are suppressed when operation of the fuel cell is started.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a graph showing the relationship between the residual hydrogen concentration and the elapsed time after operation of the fuel cell stack is stopped.

DESCRIPTION OF THE PREFERRED EMBODIMENTS

Figure 1:
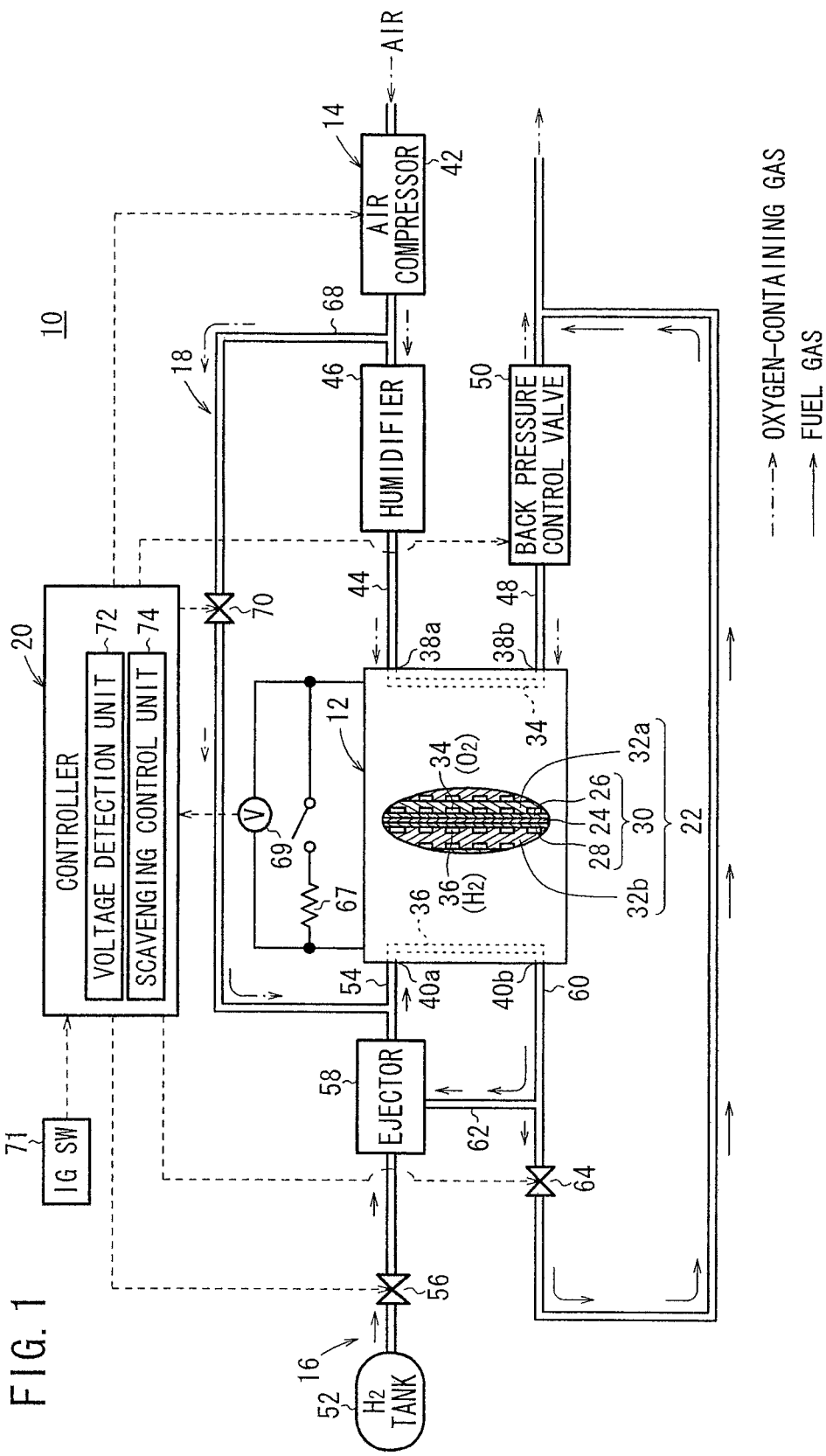
FIG. 1 is a diagram schematically showing structure of a fuel cell system according to a first embodiment of the present invention.

FIG. 1 is a diagram schematically showing a fuel cell system 10 according to a first embodiment of the present invention.

The fuel cell system 10 includes a fuel cell stack 12, an oxygen-containing gas supply apparatus 14 for supplying an oxygen-containing gas to the fuel cell stack 12, a fuel gas supply apparatus 16 for supplying a fuel gas to the fuel cell stack 12, a scavenging gas supply apparatus 18 for supplying the air as a scavenging gas to a fuel gas flow field 36 as described later, and a controller (control device) 20 for implementing the overall control of the fuel cell system 10.

The fuel cell stack 12 is formed by stacking a plurality of fuel cells 22. Each of the fuel cells 22 has a membrane electrode assembly 30 including a cathode 26, an anode 28, and a solid polymer electrolyte membrane 24 interposed between the cathode 26 and the anode 28. The membrane electrode assembly 30 is sandwiched between a pair of separators 32a, 32b. An oxygen-containing gas flow field 34 for supplying the oxygen-containing gas to the cathode 26 is formed between the membrane electrode assembly 30 and the separator 32a, and a fuel gas flow field 36 for supplying the fuel gas to the anode 28 is formed between the membrane electrode assembly 30 and the separator 32b.

An electrolyte membrane with suppressed gas permeability is adopted as the solid polymer electrolyte membrane 24. For example, as disclosed in Japanese Laid-Open Patent Publication No. 2007-026888, the solid polymer electrolyte membrane 24 includes hydrocarbon material, and is made of sulfonated polyarylenes including constituent units each having a nitrogen atom, a sulfonate group, and a main chain of a phenylene bond. Since the gas permeability of the electrolyte membrane is suppressed, after operation of the fuel cell system 10 is stopped, it takes a long period of time to reach the equilibrium state of gas concentration in the oxygen-containing gas flow field 34 and the fuel gas flow field 36, in comparison with the case of adopting a membrane including fluorine material.

An oxygen-containing gas supply passage 38a for supplying an oxygen-containing gas such as the air to the oxygen-containing gas flow field 34 and an oxygen-containing gas discharge passage 38b for discharging the oxygen-containing gas from the oxygen-containing gas flow field 34 are formed at one end of the fuel cell stack 12 in the stacking direction. A fuel gas supply passage 40a for supplying the fuel gas such as a hydrogen-containing gas to the fuel gas flow field 36 and a fuel gas discharge passage 40b for discharging the fuel gas from the fuel gas flow field 36 are formed at the other end of the fuel cell stack 12 in the stacking direction.

The oxygen-containing gas supply apparatus 14 includes an air compressor 42 for compressing the atmospheric air from the outside and supplying the compressed air to the fuel cell stack 12. The air compressor 42 is provided in an air supply channel 44. Further, a humidifier 46 is provided in the air supply channel 44. The air supply channel 44 is connected to the oxygen-containing gas supply passage 38a of the fuel cell stack 12.

The oxygen-containing gas supply apparatus 14 includes an air discharge channel 48 connected to the oxygen-containing gas discharge passage 38b. A back pressure control valve 50 is provided in the air discharge channel 48 for regulating the pressure of the air supplied from the air compressor 42 to the fuel cell stack 12 through the air supply channel 44.

The fuel gas supply apparatus 16 includes a hydrogen tank 52 for storing a high pressure hydrogen (hydrogen-containing gas). The hydrogen tank 52 is connected to the fuel gas supply passage 40a of the fuel cell stack 12 through a hydrogen supply channel 54. A hydrogen interruption valve 56 and an ejector 58 are provided in the hydrogen supply channel 54. An off gas channel 60 is connected to the fuel gas discharge passage 40b, and the off gas channel 60 is connected to a hydrogen circulation channel 62. The hydrogen circulation channel 62 is connected to the ejector 58. A purge valve 64 is provided in the off gas channel 60.

The hydrogen gas is supplied from the hydrogen tank 52 to the ejector 58. The ejector 58 supplies the hydrogen gas to the fuel cell stack 12 through the hydrogen supply channel 54. Further, the ejector 58 sucks the exhaust gas containing the unconsumed hydrogen gas which has not been consumed in the fuel cell stack 12, from the hydrogen circulation channel 62. The exhaust gas sucked by the ejector 58 is supplied again to the fuel cell stack 12.

The scavenging gas supply apparatus 18 includes an air branch channel 68. The air branch channel 68 is connected to the air supply channel 44 at a position between the air compressor 42 and the humidifier 46. An interruption valve 70 is provided in the air branch channel 68. The air branch channel 68 is connected to the hydrogen supply channel 54 at a position between the fuel cell stack 12 and the ejector 58.

A load 67 having a switch, and a voltage sensor 69 are connected to the fuel cell stack 12. For example, the load 67 is a motor for driving the vehicle, or an air compressor. The voltage sensor 69 detects the voltage of the fuel cell stack 12 (the total voltage of the entire fuel cell stack 12, the cell voltage of each fuel cell 22, or the average voltage of the cell voltages of a plurality of the fuel cells 22).

The controller 20 is electrically connected to the air compressor 42, the back pressure control valve 50, the hydrogen interruption valve 56, the ejector 58, and the purge valve 64. Further, the controller 20 is electrically connected to the voltage sensor 69 and an ignition switch 71.

The controller 20 has functions of a voltage detection unit 72 and a scavenging control unit 74. After operation of the fuel cell system 10 is stopped, the voltage detection unit 72 detects the voltage of the fuel cell stack 12, the cell voltage of the fuel cell 22, or the average voltage of a plurality of the cell voltages (hereinafter simply referred to as the voltage of the fuel cell stack 12). After the detected voltage is decreased temporarily, increased, and decreased again to become a preset voltage or less, the scavenging control unit 74 operates the scavenging gas supply apparatus 18 to start scavenging in the fuel gas flow field 36.

Figure 2:
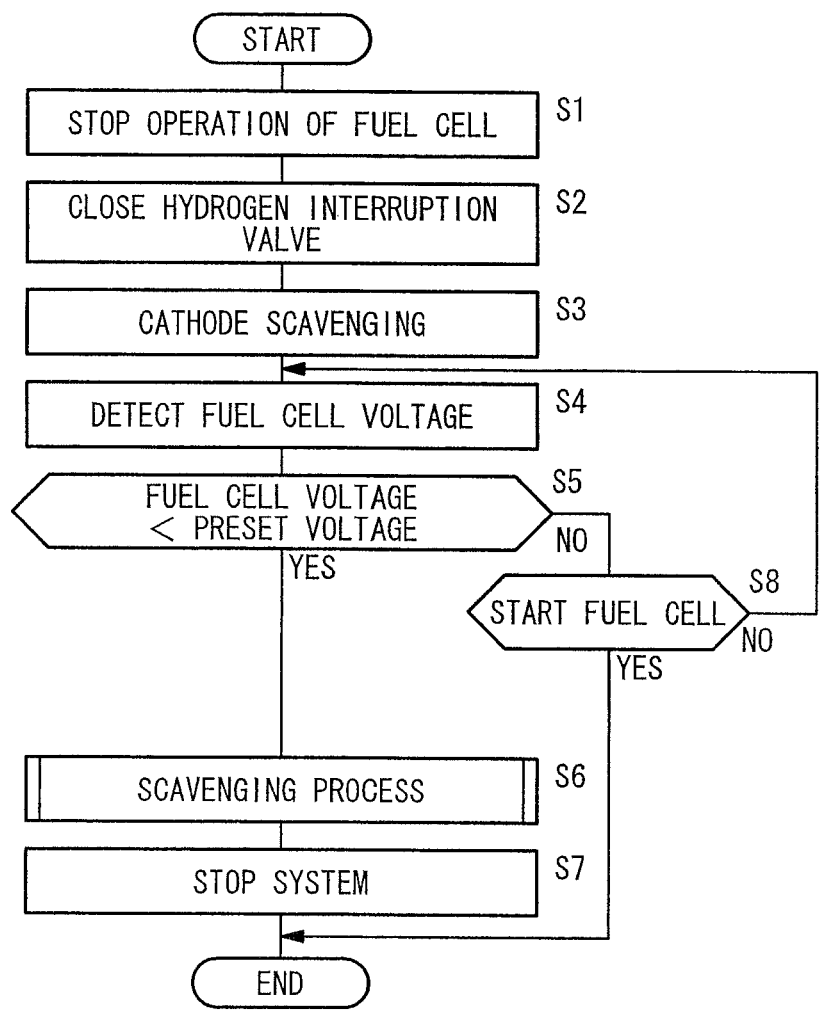
FIG. 2 is a flow chart showing a scavenging method according to the first embodiment.

Operation of the fuel cell system 10 will be described in the context of a scavenging method according to a first embodiment of the present invention with reference to a flow chart shown in FIG. 2.

Firstly, the ignition switch 71 of the fuel cell system 10 is turned off to stop operation of the fuel cell stack 12. After the load 67 is interrupted (step S1), the process proceeds to step S2 for closing the hydrogen interruption valve 56. Thus, the supply of hydrogen is interrupted.

Then, the process proceeds to step S3 for supplying the air to the fuel cell stack 12 by operation of the air compressor 42. The air is supplied to the oxygen-containing gas flow field 34 for scavenging at the cathode 26. Then, operation of the air compressor 42 is stopped temporarily. In the fuel cell stack 12, the voltage of the fuel cell stack 12 is detected by a voltage sensor 69 (step S4).

Figure 3:
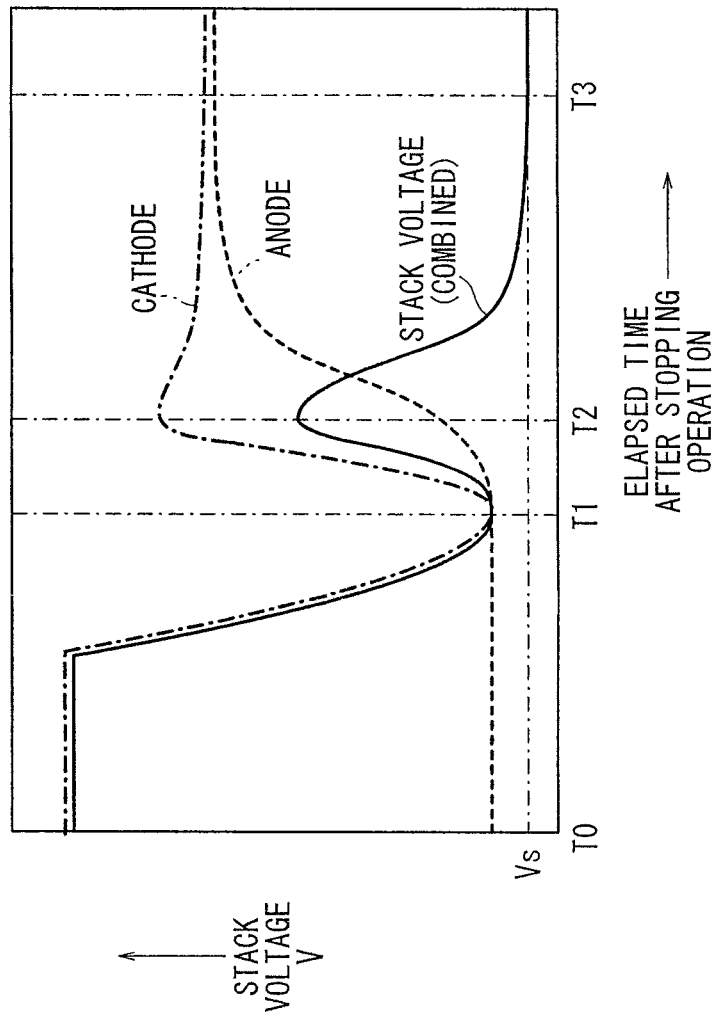
FIG. 3 is a graph showing the relationship between the voltage of a fuel cell stack and the elapsed time after operation of the fuel cell stack is stopped.
Figure 4:
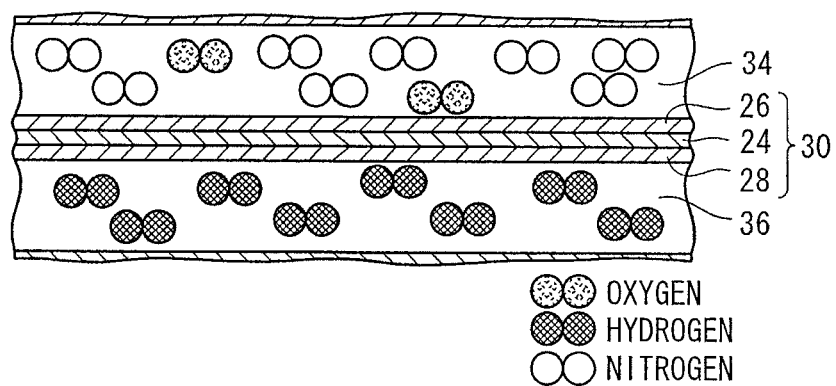
FIG. 4 is a view showing remaining gases in a fuel cell immediately after operation of the fuel cell stack is stopped.

As can be seen from FIG. 3, after operation of the fuel cell stack 12 is stopped, the stack voltage changes over time. Specifically, at the time (T0) when operation of the fuel cell stack 12 is stopped, as shown in FIG. 4, the air containing oxygen and nitrogen is present in the oxygen-containing gas flow field 34, and hydrogen as the fuel gas is present in the fuel gas flow field 36.

Therefore, reactions occur in each of the fuel cell 22 to consume oxygen and hydrogen. Since supply of hydrogen has been stopped, the voltage of the fuel cell stack 12 is decreased temporarily.

Figure 5:
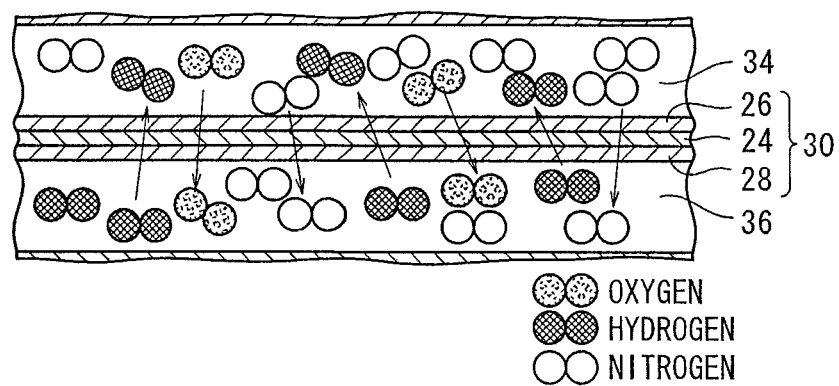
FIG. 5 is a view showing cross leakage in the fuel cell after operation of the fuel cell stack is stopped.

Then, in each of the fuel cells 22, the air remaining in the oxygen-containing gas flow field 34 passes through the membrane electrode assembly 30, and leaks to the fuel gas flow field 36, and the hydrogen remaining in the fuel gas flow field 36 passes through the membrane electrode assembly 30, and leaks to the oxygen-containing gas flow field 34 (see FIG. 5). Therefore, reactions are induced in the oxygen-containing gas flow field 34 and the fuel gas flow field 36, and potentials at the cathode 26 and the anode 28 are increased. Therefore, the voltage of the fuel cell stack 12 is increased after the elapsed time T1 (see FIG. 3).

Figure 6:
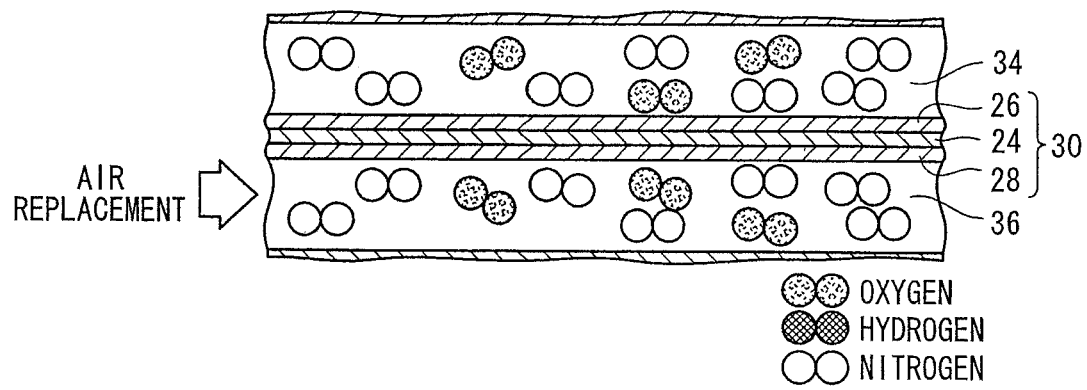
FIG. 6 is a view showing a state in which the air in the fuel cell is replaced after operation of the fuel cell system is stopped.

After the elapsed time T2, the potentials at the cathode 26 and the anode 28 are changed to have closer values. Therefore, the voltage of the fuel cell stack 12 is decreased from the elapsed time T2. Then, at the elapsed time T3, as shown in FIG. 6, the gases in the oxygen-containing gas flow field 34 and the fuel gas flow field 36 have been replaced with the air.

In this manner, the voltage VS of the fuel cell stack 12 in the state where the fuel gas (hydrogen gas) is replaced with the air is set to a threshold voltage for starting the air scavenging process in the fuel gas flow field 36. In effect, the voltage VS is set in a range of 0.3 V to 0.6 V. Preferably, the voltage VS is set in a range of 0.4 V to 0.5 V.

Then, in step S5, if it is determined that the detected voltage (FC voltage) of the fuel cell stack 12 is less than the preset voltage (VS) (YES in step S5), the process proceeds to step S6 for performing the scavenging process. In the scavenging process, the air compressor 42 is operated, and the interruption valve 70 and the purge valve 64 are opened.

Therefore, the air supplied from the air compressor 42 to the air supply channel 44 flows into every oxygen-containing gas flow field 34 of the fuel cell stack 12, and flows through the air branch channel 68 into every fuel gas flow field 36 of the fuel cell stack 12. Therefore, scavenging using the air is performed in the oxygen-containing gas flow field 34 and the fuel gas flow field 36. Then, operation of the air compressor 42 is stopped, and the interruption valve 70 and the purge valve 64 are closed. Thus, operation of the entire fuel cell system 10 is stopped (step S7). It should be noted that scavenging (cathode scavenging) using the air in the oxygen-containing gas flow field 34 may be carried out only by the step S3, or may be performed by the step S6 without performing the scavenging process of the step S3.

In the first embodiment, after operation of the fuel cell stack 12 is stopped, the voltage of the fuel cell stack 12 is detected. After the detected voltage is decreased temporarily, increased, and then, decreased again down to the preset voltage or less, scavenging in the fuel gas flow field 36 is performed using the air. That is, the fuel gas in the fuel gas flow field 36 is replaced with the air, and the gas in the oxygen-containing gas flow field 34 is replaced with the air (see FIG. 6). In this state, scavenging in the fuel gas flow field 36 and the oxygen-containing gas flow field 34 is started using the air.

Figure 7:
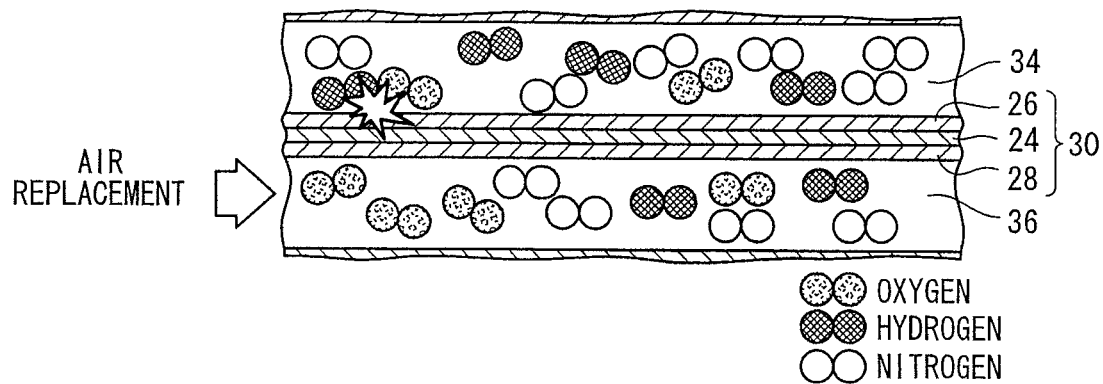
FIG. 7 is a view showing a state after air scavenging is performed in the presence of cross leakage.

Thus, in the oxygen-containing gas flow field 34 and the fuel gas flow field 36, gas reactions are not induced, and it is possible to reliably prevent degradation of the cathode 26 and the anode 28. For example, in the state at the elapsed time T1 (see FIG. 5), if scavenging in the fuel gas flow field 36 is performed using the air, as shown in FIG. 7, at the inlet of the oxygen-containing gas flow field 34, the cathode 26 may be damaged undesirably due to the high potential.

Therefore, by performing scavenging using the air after the gases in the oxygen-containing gas flow field 34 and the fuel gas flow field 36 have been replaced with the air, it is possible to effectively prevent degradation of the membrane electrode assembly 30.

When a relatively short period of time has elapsed after stopping operation of the fuel cell stack 12, i.e., if the voltage of the fuel cell stack 12 is the preset voltage or more (NO in step S5), and operation of the fuel cell stack 12 is started (YES in step S8), the gases in the fuel gas flow field 36 and the oxygen-containing gas flow field 34 are not replaced with the oxygen-containing gas and scavenging in the fuel gas flow field 36 using the air is not performed.

Therefore, the frequency of performing scavenging in the fuel gas flow field 36 is reduced, and it is possible to suitably suppress degradation of the anode 28 by scavenging using the air. Accordingly, since the frequency of performing scavenging in the fuel gas flow field 36 is reduced, it is possible to prevent degradation of the anode 28 at the time of starting operation of the fuel cell stack 12.

Further, the frequency of using the air compressor 42 for scavenging in the fuel gas flow field 36 using the air is reduced. Therefore, generation of noises from the air compressor 42 is suppressed, and the electrical energy required for operating the air compressor 42 is reduced. It becomes possible to prevent the energy efficiency from being lowered.

Further, in the period after stopping operation of the fuel cell stack 12 until the air scavenging of the fuel gas flow field 36, the water remaining in the fuel gas flow field 36 is cooled, and water condensation occurs easily. Therefore, at the timing of scavenging in the fuel gas flow field 36 using the air, the condensed water remaining in the fuel gas flow field 36 is reliably discharged, and the performance of starting operation of the fuel cell stack 12 at low temperature is effectively improved advantageously. In the first embodiment, after stopping operation of the fuel cell stack 12, the voltage of the fuel cell stack 12 is detected, and based on the change in the voltage, scavenging in the fuel gas flow field 36 using the air is started. However, the present invention is not limited in this respect. For example, based on the elapsed time after stopping operation of the fuel cell stack 12, the change in the voltage in the fuel cell stack 12 may be detected (see FIG. 3) for starting scavenging in the fuel gas flow field 36 using the air.

Figure 8:
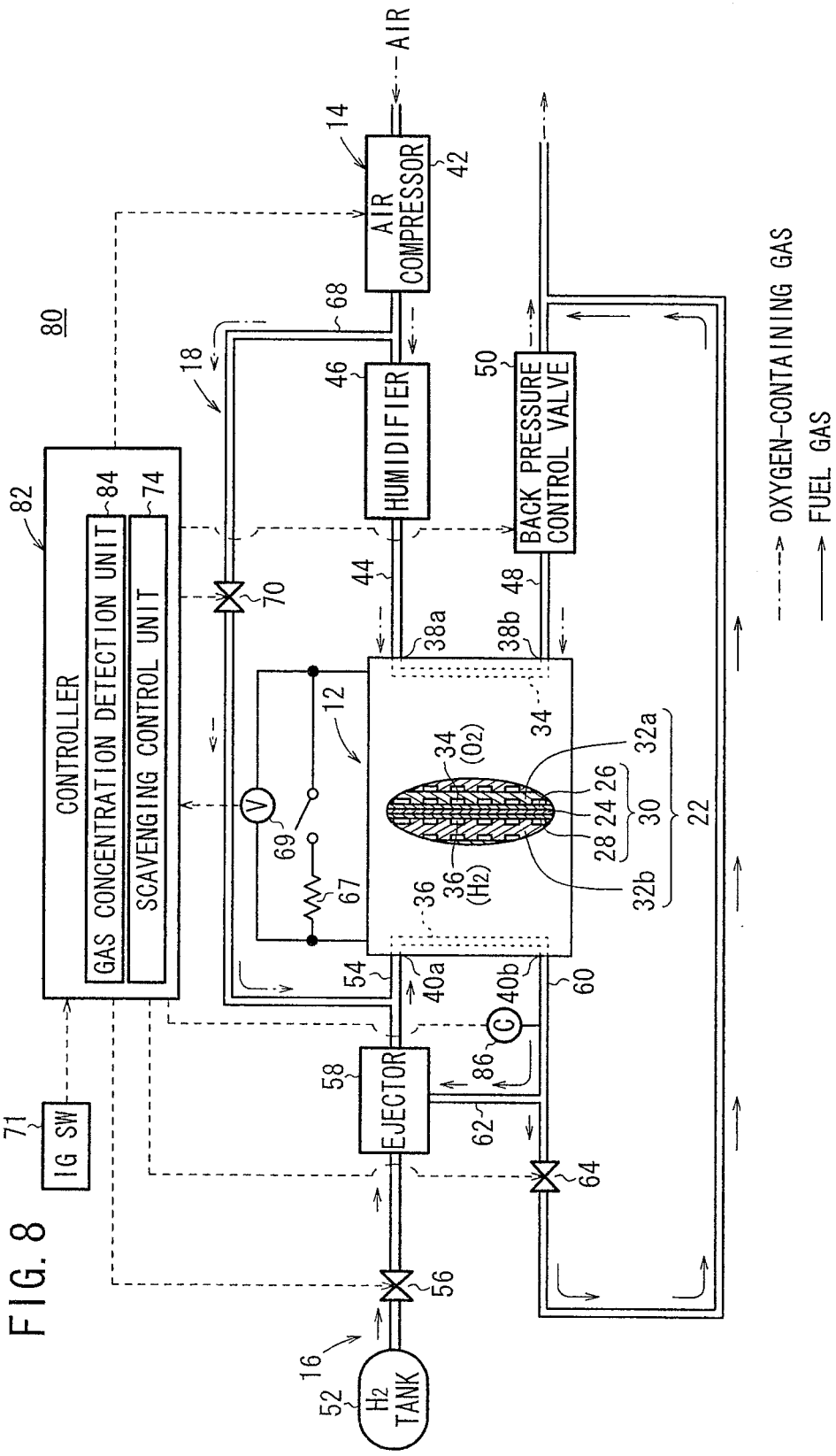
FIG. 8 is a diagram schematically showing structure of a fuel cell system according to a second embodiment of the present invention.

FIG. 8 is a diagram schematically showing structure of a fuel cell system 80 according to a second embodiment of the present invention. The constituent elements that are identical to those of the fuel cell system 10 according to the first embodiment are labeled with the same reference numerals, and descriptions thereof are omitted.

The fuel cell system 80 includes a controller 82 having functions of a gas concentration detection unit 84 and a scavenging control unit 74. The gas concentration detection unit 84 detects gas concentration of the fuel cell stack 12 after operation of the fuel cell stack 12 has been stopped. The scavenging control unit 74 starts scavenging in the fuel gas flow field 36 by the scavenging gas supply apparatus 18 when it is determined that the fuel gas remaining in the fuel gas flow field 36 has been replaced with the air based on the detected gas concentration. For example, a hydrogen concentration sensor 86 is provided in an off gas channel 60 connected to the fuel cell stack 12.

Figure 9:
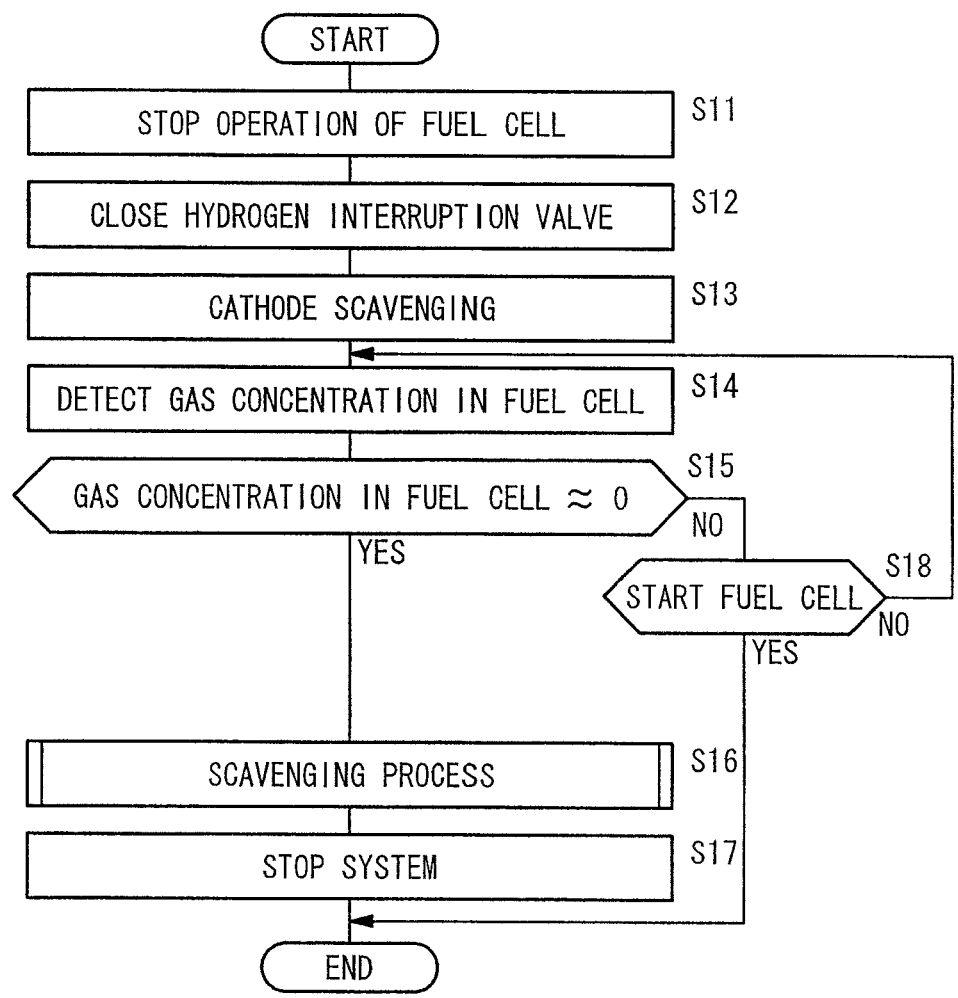
FIG. 9 is a flow chart showing a scavenging method according to a second embodiment of the present invention.

A scavenging method for the fuel cell system 80 will be described with reference to a flow chart shown in FIG. 9.

Firstly, in the same manner as in the case of the steps S1 to S3 described above, steps S11 to S13 are performed. Thereafter, based on the detection signal from the hydrogen concentration sensor 86, the gas concentration detection unit 84 detects hydrogen gas concentration in the fuel gas flow field 36 of the fuel cell stack 12 (step S14).

After stopping operation of the fuel cell stack 12, as shown in FIG. 10, the gas concentration of the hydrogen remaining in the fuel gas flow field 36 is decreased over time. Because, as described with respect to the first embodiment, after stopping operation of the fuel cell stack 12, the residual hydrogen (fuel gas) and the residual air (oxygen-containing gas) react with each other, and additionally, cross leakage of the hydrogen and the air is induced.

At the elapsed time T3, the hydrogen gas concentration remaining in the fuel gas flow field 36 becomes substantially "0" (YES in step S15), and the process proceeds to step S16 for performing the scavenging process. Thereafter, operation of the fuel cell system 80 is stopped (step S17).

Further, if operation of the fuel cell stack 12 is started before the concentration of the hydrogen gas remaining in the fuel gas flow field 36 reaches "0" (YES in step S18), without performing the scavenging process, operation of the fuel cell system 10 is started.

As described above, in the second embodiment, at the time of performing scavenging in the fuel gas flow field 36 using the air, since no fuel gas remains in the fuel gas flow field 36, it is possible to prevent unwanted reactions from being induced. Thus, it is possible to suitably prevent degradation of the membrane electrode assembly 30.

Further, since the frequency of scavenging in the fuel gas flow field 36 is reduced, the same advantages as in the case of the first embodiment are obtained. For example, in particular, degradation of the anode 28 is prevented, and generation of noises and decrease in the energy efficiency are suppressed.

Further, in the second embodiment, the hydrogen concentration sensor 86 is used for detecting that the fuel gas in the fuel gas flow field 36 has been replaced with the air. However, the present invention is not limited in this respect. The air replacement in the fuel gas flow field 36 may be detected based on the states of the other remaining gases such as the oxygen or the nitrogen.

While the invention has been particularly shown and described with reference to preferred embodiments, it will be understood that variations and modifications can be effected thereto by those skilled in the art without departing from the spirit of the invention as defined by the appended claims.

What is claimed is:

1. A scavenging method for a fuel cell system, the fuel cell system comprising:
    a fuel cell for performing power generation by electrochemical reactions of an oxygen-containing gas and a fuel gas supplied to the fuel cell, an oxygen-containing gas flow field being formed in the fuel cell for supplying the oxygen-containing gas to the cathode, a fuel gas flow field being formed in the fuel cell for supplying the fuel gas to the anode,
    an oxygen-containing gas supply apparatus for supplying the oxygen-containing gas to the oxygen-containing gas flow field;
    a fuel gas supply apparatus for supplying the fuel gas to the fuel gas flow field;
    a scavenging gas supply apparatus for supplying air as a scavenging gas to the fuel gas flow field; and
    a control device,
    the scavenging method comprising the steps of:
        stopping supply of the fuel gas after operation of the fuel cell is stopped;
        after stopping supply of the fuel gas, replacing the fuel gas remaining in the fuel gas flow field with air due to movement of the remaining fuel gas from the fuel gas flow field to the oxygen-containing gas flow field through the electrolyte membrane and movement of air from the oxygen-containing gas flow field to the fuel gas flow field through the electrolyte membrane; and
        starting scavenging in the fuel gas flow field by the scavenging gas supply apparatus based upon a determination that the fuel gas remaining in the fuel gas flow field has been replaced with air.

2. A scavenging method according to claim 1, wherein whether or not the fuel gas remaining in the fuel gas flow field has been replaced with air is determined based on gas concentration in the fuel cell.

* * * * *